United States Patent

Priest et al.

[11] Patent Number: 5,813,601
[45] Date of Patent: Sep. 29, 1998

[54] TEMPERATURE RESPONSIVE FLOW CONTROL VALVE

[75] Inventors: Wayne A. Priest, Kansas City; Philip M. Burger, Lenexa, both of Kans.

[73] Assignee: Burger Engineering, Inc., Olathe, Kans.

[21] Appl. No.: 873,376

[22] Filed: Jun. 12, 1997

[51] Int. Cl.⁶ .................................................. G05D 23/12
[52] U.S. Cl. ............................................................ 236/93 A
[58] Field of Search ................................. 236/93 A, 99 J

[56] References Cited

U.S. PATENT DOCUMENTS

| | | | |
|---|---|---|---|
| 3,096,936 | 7/1963 | Woods | 236/93 |
| 3,659,783 | 5/1972 | Schwartz | 236/93 A |
| 3,950,118 | 4/1976 | Adair | 425/144 |
| 4,175,697 | 11/1979 | Dreibelbis | 236/93 A |
| 4,203,545 | 5/1980 | Fackler | 236/93 A |
| 4,288,033 | 9/1981 | Wisyanski | 236/93 A |
| 4,303,197 | 12/1981 | Sandau | 236/92 R |
| 4,354,812 | 10/1982 | Wieder et al. | 425/144 |
| 4,420,446 | 12/1983 | Wieder et al. | 264/40.6 |
| 4,488,680 | 12/1984 | Itoh | 236/93 A |
| 4,853,134 | 8/1989 | Cure et al. | 210/742 |
| 4,902,454 | 2/1990 | Steinbichler et al. | 264/40.6 |
| 4,922,996 | 5/1990 | Rees | 165/1 |
| 5,018,665 | 5/1991 | Sulmone | 236/93 A |
| 5,215,065 | 6/1993 | Snyder | 123/557 |
| 5,376,317 | 12/1994 | Maus et al. | 264/40.6 |
| 5,382,147 | 1/1995 | Mirua et al. | 425/144 |
| 5,427,720 | 6/1995 | Kotzab | 264/40.6 |
| 5,452,999 | 9/1995 | Evans | 425/144 |
| 5,516,042 | 5/1996 | Gerstengerger | 236/93 A |
| 5,589,114 | 12/1996 | Evans | 264/40.6 |
| 5,591,385 | 1/1997 | Arai et al. | 264/40.6 |

*Primary Examiner*—William E. Tapolcai
*Attorney, Agent, or Firm*—Litman, McMahon, Brown, L.L.C.

[57] ABSTRACT

A temperature responsive flow control valve has a plunger type actuator positioned in a fluid flow passageway between a valve head and an adjustable abutment member. The actuator includes a canister filled with a heat expansible material which expands upon heating to drive the actuator from the canister so as to engage the valve head and drive it out of seated engagement with a valve seat against the biasing force of a spring. The abutment member is axially adjustable toward and away from the valve seat to adjust the distance therebetween. By adjusting the distance between the abutment member and the valve seat the temperature at which the actuator expands to a sufficient degree to open the valve may be adjusted. A controlled leak through the valve is provided.

10 Claims, 2 Drawing Sheets

TEMPERATURE RESPONSIVE FLOW CONTROL VALVE

BACKGROUND OF THE INVENTION

The present invention relates to temperature responsive flow control valves and in particular such a valve for use in controlling the flow of cooling water through a cooling system.

Mold plates for plastic injection molding are typically cooled by circulating cooling water through the mold plates. In some molding applications, it is desirable to maintain the temperature of the mold plates above the temperature at which the plates would normally be cooled simply by circulating a large volume of water therethrough. In such applications, the cooling water is often preheated before circulation through the mold plates to a temperature approaching the desired temperature of the mold plates. A large volume of the preheated cooling water is allowed to flow through the mold plates to cool the mold plates to a temperature approaching the temperature of the circulated water. Such systems involve increased utility costs in heating the water and increased equipment costs in providing and maintaining the heaters.

Systems have been developed for controlling the temperature of the mold plates by controlling the flow of cooling water therethrough in response to the temperature of the mold plates such as shown in U.S. Pat. No. 4,354,812 to Wieder et al. As disclosed therein, temperature sensors mounted to the mold plates communicate with a valve, upstream of the mold plates. The valve controls the flow of cooling water through the system in response to a signal from the temperature sensors. Such systems are relatively expensive and require modification of the mold plates for attachment of the temperature sensors thereto.

U.S. Pat. No. 3,950,118 discloses a system for controlling the temperature profile across a heat exchanger, such as employed on an extrusion die. In the system disclosed, the temperature of fluid leaving the heat exchanger is measured and the rate of flow of fluid through the heat exchanger is controlled in response to the measured temperature to maintain the measured temperature at a predetermined value. Although utilization of such a system in a molding application would not require modification of the mold plates, it would require utilization of relatively expensive controllers and temperature sensors which would also require increased maintenance.

There remains a need for a relatively inexpensive means for controlling the temperature of molds and the like and in particular for a temperature responsive flow control valve which can be utilized with existing cooling systems to control the flow of coolant through the molds and therefore the temperature of the mold plates.

SUMMARY OF THE INVENTION

The present invention comprises a temperature responsive flow control valve utilizing a temperature responsive actuator for opening the valve. The valve is adapted for use in controlling the flow of cooling water through a mold or similar equipment to control the temperature thereof. The valve is positioned downstream of the equipment to be cooled and opens when the temperature of the cooling water exiting the equipment reaches a set point temperature. The valve includes a set point adjustment mechanism for adjusting the set point temperature at which the actuator opens the valve.

The actuator is of the type whose length increases as it is heated. The actuator is positioned in a fluid flow passageway of the valve upstream of an annular valve seat and a valve head which is biasingly urged into a seated relationship with the valve seat from a downstream side of the valve seat. A first or front end of the actuator is positioned proximate the valve head and a second or rear end of the actuator is positioned proximate an adjustable abutment member. The abutment member may be advanced toward and away from the valve seat so as to adjust the distance between the abutment member and the valve head in the seated position.

When the actuator is heated past a temperature at which the length of the actuator corresponds to the distance between the abutment member and the seated valve head, the actuator drives the valve head out of seated engagement with the valve seat thereby opening the valve to allow cooling water to flow therethrough at a rate sufficient to cool the mold to a desired temperature corresponding to the set point temperature. By adjusting the position of the abutment member relative to the seated valve head, the temperature at which the valve opens can be adjusted.

The valve head and seat are shaped to provide a controlled leak through the valve at all times such that the temperature of the cooling water around the actuator more quickly reflects the rising temperature of the cooling water as the equipment is put to use.

OBJECTS AND ADVANTAGES OF THE INVENTION

The objects of the invention include, providing a relatively inexpensive temperature responsive flow control valve in which opens when the temperature of the liquid on the upstream side thereof exceeds a set point; providing such a valve in which the temperature at which the valve opens is adjustable; providing such a valve which utilizes an actuator whose length increases with increasing temperature; providing such a valve in which the valve head does not form a complete seal with the valve seat when seated such that a small amount of liquid is allowed to flow through the valve even when the valve head is seated; and to provide such a valve which is particularly well adapted for controlling the flow of cooling water through a mold to cool the mold to a desired temperature.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 5:
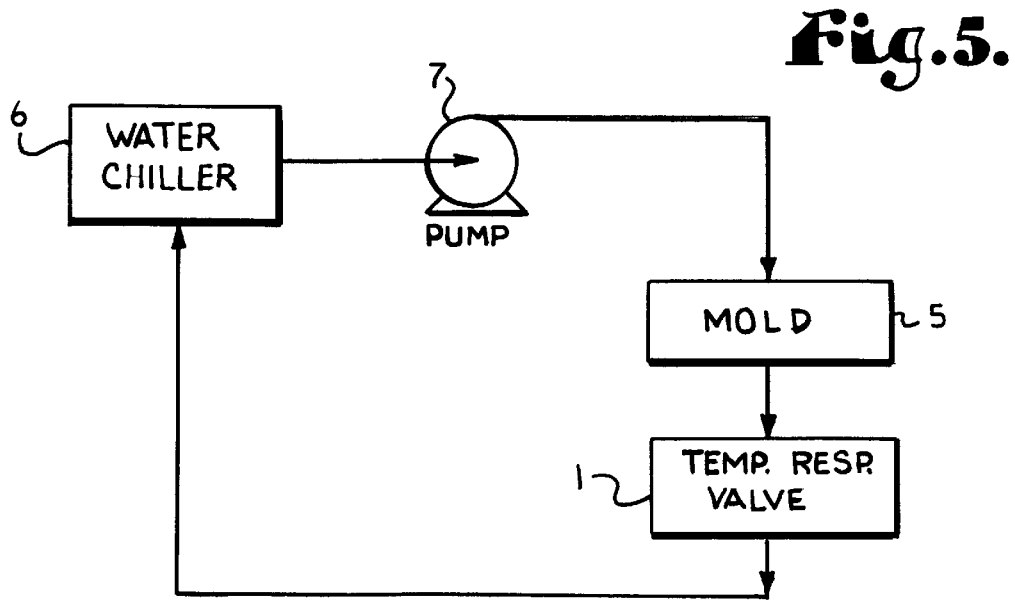
FIG. 5 is a process flow diagram showing use of a temperature responsive flow control valve of the present invention to control the temperature of a mold.

Referring to the drawings in more detail, the reference numeral 1 refers to a temperature responsive flow control valve of the present invention. FIG. 5 is a schematic diagram showing the valve 1 used for controlling the flow of cooling water through a mold 5. Cooling water is circulated from a water chiller 6, through cooling channels in mold 5, and through valve 1 by pump 7. The valve 1 is designed to open when the temperature of the water exiting the mold 5 exceeds a set point temperature of the valve 1.

Figure 1:
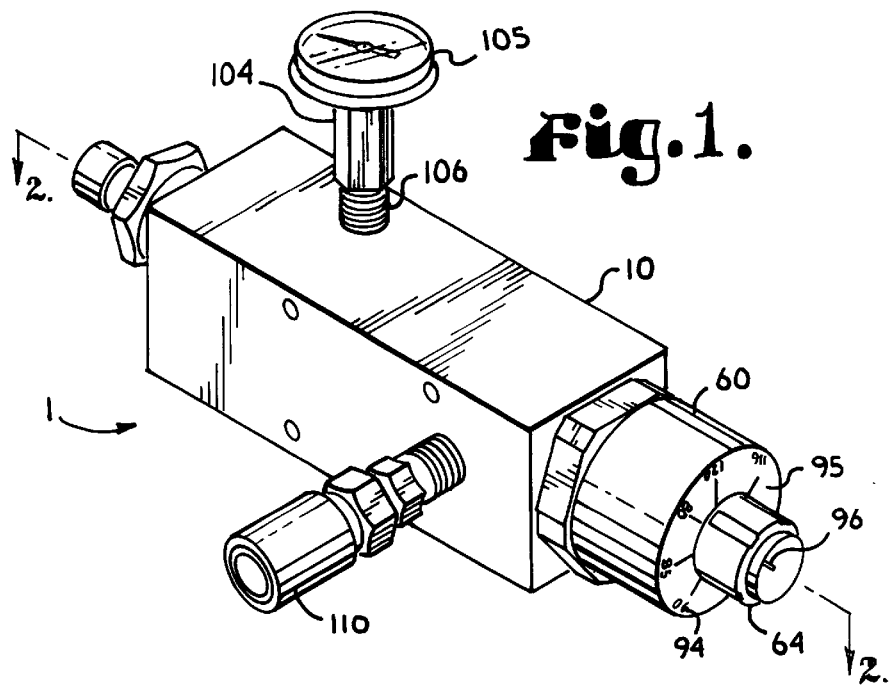
FIG. 1 is a perspective view of a temperature responsive flow control valve of the present invention.
Figure 2:
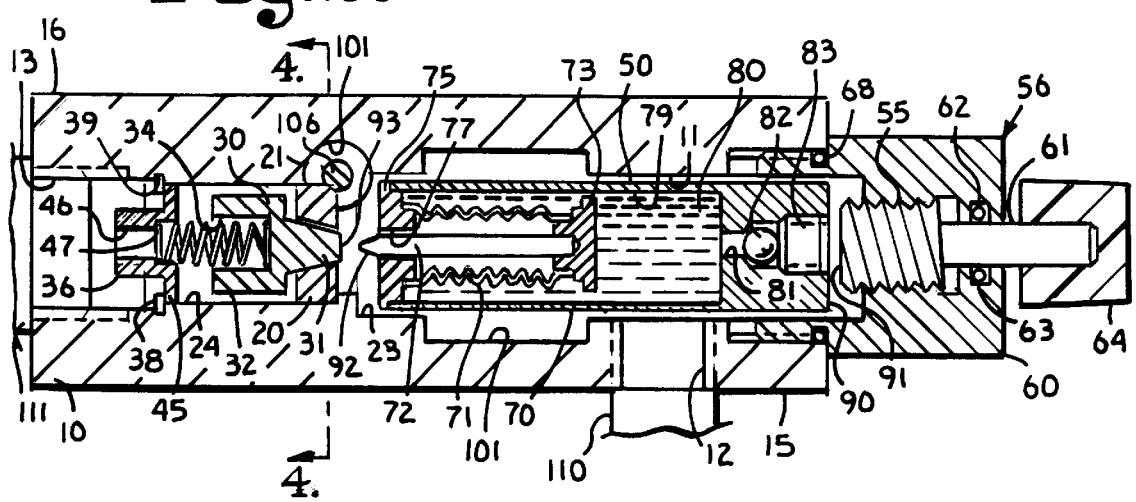
FIG. 2 is an enlarged and fragmentary cross-sectional view taken along line 2—2 of FIG. 1 showing the valve closed.
Figure 3:
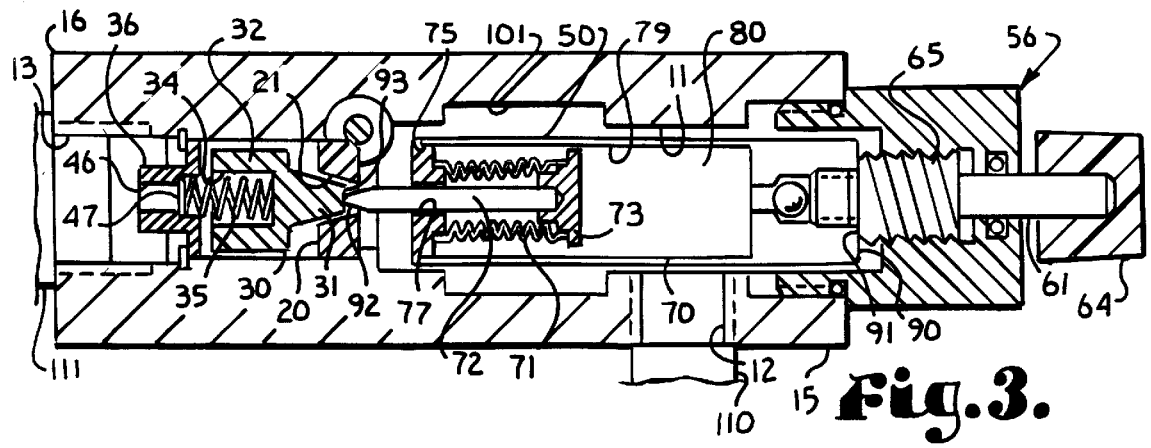
FIG. 3 is a view similar to FIG. 2 showing the valve open.

The valve 1, as shown in FIGS. 1 through 4, includes a valve body 10 having a main fluid flow passageway 11 extending therein in connection with an inlet opening 12 and an outlet opening 13. The main fluid flow passageway 11, as shown in FIGS. 2 and 3, is formed by a bore extending completely through the valve body 10. The inlet opening 12 extends into the valve body 10 generally at a first end 15 thereof and transverse to the main fluid flow passageway 11. The outlet opening 13 extends into the valve body 10 generally at a second end 16 thereof and generally in axial alignment with the main fluid flow passageway 11. For reference purposes the end of the valve on the right side of FIGS. 1–3 will generally be referred to as the first end or inlet end of the valve 1 and the end on the left side of FIGS. 1–3 will generally be referred to as the second end or inlet end of the valve 1.

A valve seat 20, formed by an annular member is secured to the valve body 10 therein, across the main fluid flow passageway 11. The valve seat 20 includes a valve seat opening 21 extending therethrough. The valve seat 20 generally divides the main fluid flow passageway 11 into an inlet side 23 and an outlet side 24. The valve seat opening 21 is preferably frusto conical shaped with the smaller end opening to the inlet side 23 of the main fluid flow passageway 11.

Figure 4:
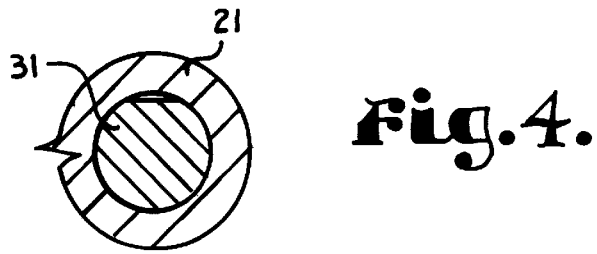
FIG. 4 is an enlarged and fragmentary cross-sectional view taken along line 4—4 of FIG. 2.

A valve head 30 is biasingly urged into engagement with the valve seat 20 so as to extend across the valve seat opening 21. The valve head 30 includes a front portion 31 which is frusto conical and sized to fit in the valve seat opening 21 and form a seal with the valve seat 20. One side of the front portion 31 is flattened such that the valve head 30 forms an incomplete seal with the valve seat 20 as generally shown in FIG. 4. The incomplete seal allows a controlled or calibrated leak through the valve 1 for reasons described in more detail below.

A rear portion 32 of the valve head 30 is cylindrical having a spring receiving bore 34 extending therein. A first or front end of a compression spring 35 is positioned within the spring receiving bore 34. A second or rear end of the spring 35 abuts against an annular spring retaining cap 36 which is prevented from rearward movement by a retention clip 38 secured within an annular groove 39 extending into the valve body 10 from the main fluid flow passageway 11.

The spring retaining cap 36 includes a lip or flange 45, a rear surface of which is urged against the retention clip 38. A bore 46 extends through the spring retaining cap 36 and the second end of the spring 35 abuts against a shoulder 47 within bore 46. The spring 35 biases the valve head 30 into engagement with the valve seat 20 preferably with a constant spring force of approximately six to eight pounds which is sufficient to prevent the valve head from unseating from the pressure of the cooling water alone.

A temperature responsive actuator 50 is positioned within the main fluid flow passageway 11 on the inlet side 23 thereof between the valve seat 20 and an adjustable abutment member 55 which is part of a set point adjustment mechanism 56. The set point adjustment mechanism 56 further comprises an end cap or plug 60 within which the abutment member 55 is threadingly secured, shaft 61 which is integrally formed with abutment member 55 and rotatably secured in the cap 60, O-ring 62 secured within an annular channel 63 in the cap 60, and knob 64 secured to shaft 61.

The end cap 60 is threadingly secured to the valve body 10 at the first end 15 thereof across the bore forming the main fluid flow passageway 11. O-ring 68 forms a water tight seal between the end cap 60 and valve body 10. Rotation of the knob 64 advances the abutment member 55 toward or away from the valve seat 20 so as to vary the distance therebetween.

The actuator 50 generally comprises a canister or capsule 70, bellows 71 and plunger or shaft 72. A plunger engaging cap 73 is secured to the bellows 71 at an inner or rear end thereof. A rear end of the plunger 72 abuts against or is secured to the plunger engaging cap 73. An outer or front end of the bellows 71 is secured to a canister cap 75 which is secured to a front end of the canister 70 and has a plunger opening 77 extending therethrough. The plunger 72 extends through the plunger opening 77 for sliding motion relative thereto. For reference purposes, the end of the actuator to the right in FIGS. 1–3 is referred to as a rear end and the end to the left is generally referred to as the front end.

An internal space 79 of the canister 70 is filled with a heat expansible material 80 which expands upon heating. The heat expansible material 80 preferably has a relatively high expansion ratio. A preferred material comprises xylene, although a wide range of materials could be utilized such as glycerin and water or ethylene glycol and water. The material utilized may depend in large part upon the range of the set point temperatures desired. The internal space 79 of canister 70 is filled through inlet 81 which is sealed by ball bearing 82 and set screw 83. Upon heating of the canister 70 through heat transfer from the cooling water flowing past the canister 70, the expansible material 80 expands compressing the bellows 71 driving the plunger 72 away from the canister 70 so as to increase the overall length of the actuator 50. The bellows 71 may be generally referred to as a flexible wall and it is foreseen that other types of flexible walls could be utilized including elastomeric diaphrams. Further it is foreseen that any variety of temperature responsive length adjustable actuators now known or subsequently developed could be utilized with this invention.

The canister 70 is positioned in the main fluid flow passageway 11 such that a rear end 90 of the canister 70 is positioned in close proximity to an abutment face 91 of the abutment member 55. A tip or distal end 92 of the plunger, generally comprising a front end of the actuator 50, is positioned in close proximity to a distal end 93 of the valve head 30.

When the temperature of the canister 71 is below a minimum set point temperature, the lowest temperature at which the valve 1 may be set to open, the volume of the expansible material 80 in the canister 71 is such that the overall length of the actuator 50, is equal to or less than the distance between the abutment face 91 of the abutment member 55 and the distal end 93 of the valve head 30. As the temperature of the canister 71 increases, the volume of the expansible material 80 increases such that the length of the actuator 50 increases until the rear end 90 of the actuator 50 abuts against the abutment member 55 and the tip 92 of the plunger 72 abuts against the distal end 93 of the valve head 30. Further increases in the length of the actuator 50 causes the plunger 72 to advance the valve head 30 out of seated engagement with the valve seat 20 against the biasing force of spring 35 as generally shown in FIG. 3.

The set point temperature is adjusted by advancing the abutment face 91 of the abutment member 55 toward and away from the distal end 93 of the seated valve head 30. By increasing the distance between the abutment member 55 and the distal end 93 of the seated valve head 30, the length of the actuator 50 necessary to unseat the valve head 30, and therefore the set point temperature is increased.

Temperature indicia 94, indicating the temperature of the actuator 50 at which the length of the actuator 50 is sufficient to advance the valve head 30 away from the valve seat 20 with respect to a relative position of the abutment member 55, is printed on an outer face 95 of the end cap 60 so as to indicate the degree of rotation of the abutment member 55 corresponding to the relative position of the abutment member 55. A pointer 96 is provided on the knob 64 for use in rotationally aligning the knob 64 relative to a selected temperature indicia 94.

The main fluid flow passageway 11 includes a annular relieved portion 101 for improved flow characteristics around the actuator 50. A thermometer 104 having a temperature gauge 105 at an outer end thereof which is connected to a temperature probe 106. The temperature probe 106 is secured within a temperature probe opening 107 extending through the valve body 10 and into the inlet side 23 of the main fluid flow passageway 11 proximate the valve seat 20. The thermometer provides a visual indication of the temperature of the cooling water flowing through the valve 1. Connectors 110 and 111 are connected to the valve body 10 at the inlet opening 12 and outlet opening 13 respectively.

When the valve 1 is open, cooling water flows into the inlet opening 12 from connector 110, into the main fluid flow passageway 11, including the relieved portion 101 and around the actuator 50, through the valve seat opening 21, around the valve head 30, through the opening 46 in the spring retaining cap 36 and out the outlet opening 13 and into the connector 111.

The valve 1 is particularly well adapted for use in controlling the flow of cooling water through a mold 5 to control the temperature of the mold plates and maintain the mold plates at a desired temperature during the molding process. When the molding process is initiated, the temperature of the cooling water surrounding the actuator 50 is generally the temperature of the cooling water leaving the chiller and well below the minimum set point temperature such that the actuator 50 does not engage the valve head 30 which is seated on the valve seat 20. The controlled leak due to the imperfect seal between the valve head 30 and valve seat 20 permits a continuous flow of water through the system such that the temperature of the cooling water flowing across the actuator 50 more quickly changes in response to changes in the temperature of the cooling water upstream. As the temperature of the actuator 50 exceeds the set point temperature, the actuator 50 opens the valve 1 to permit an increased flow of cooling water through the valve 1 to cool the mold plates. When the temperature of the cooling water flowing past the actuator subsequently drops below the set point temperature, the length of the actuator 50 decreases until the valve head 20 is biasingly urged back into seated alignment with the valve seat 20 by spring 35 to reduce the flow therethrough to the amount allowed by the controlled leak. The valve 1 remains closed until the temperature of the cooling water around the actuator 50 subsequently exceeds the set point temperature. The mold operator will have to do some calibration to determine the set point temperature of the valve 1 which corresponds to the desired temperature of the mold plates.

It is to be understood that while certain forms of the present invention have been illustrated and described herein, it is not to be limited to the specific forms or arrangement of parts described and shown.

What is claimed and desired to be secured by Letters Patent is as follows:

1. A temperature responsive flow control valve comprising:
   (a) a valve body having a fluid flow passageway extending therewithin; said fluid flow passageway connected proximate a first end to an inlet opening and proximate a second end to an outlet opening;
   (b) a valve seat positioned within said fluid flow passageway of said valve body between said inlet opening and said outlet opening and having a valve seat opening extending therethrough;
   (c) a valve head biasingly urged into seated engagement with said valve seat from an outlet side of said valve seat;
   (d) an abutment member secured to said valve body and extending into said fluid flow passageway at said first end thereof; said abutment member being advanceable relative to said fluid flow passageway such that the distance between said valve head and said abutment member is adjustable; and
   (e) a thermally responsive actuator having a front end and a rear end and whose length increases as the actuator is heated; said actuator positioned within said fluid flow passageway between said valve head and said abutment member such that said front end of said actuator is positioned proximate said valve head and said rear end is positioned proximate said abutment member; said rear end of said actuator engaging said abutment member and said front end of said actuator engaging said valve head and advancing said valve head away from said valve seat as the temperature of said actuator exceeds the temperature at which the length of the actuator increases to correspond to the distance between the valve head and the abutment member.

2. The valve as in claim 1 wherein:
   (a) said valve head and said valve seat are shaped to form an incomplete seal when said valve head is seated relative to said valve seat such that at least a small amount of fluid is allowed to flow past the valve head at all times.

3. The valve as in claim 1 wherein:
   (a) said abutment member is threadingly secured within a plug which is secured across said fluid flow passageway at said first end of said valve body;
   (b) said abutment member is connected to a knob by a shaft extending through said plug; and
   (c) temperature indicia is printed on an outer face of said plug radially relative to said knob and indicating the rotational orientation of the actuator at which the distance between the abutment member and the seated valve head approximately corresponds to the length of the actuator when the temperature of the actuator corresponds to the selected temperature indicia.

4. The valve as in claim 1 further comprising:
(a) a thermometer having a temperature sensing probe extending into said fluid flow passageway proximate said valve seat on an inlet side thereof and a temperature gauge extending outside of said valve body.

5. The valve as in claim 1 wherein said actuator comprises:
(a) a canister filled with a heat expansible material;
(b) a plunger slidably secured relative to said canister and extending partially through an opening in said canister; and
(c) said plunger is separated from said heat expansible material by a flexible wall.

6. The valve as in claim 5 wherein said wall comprises a bellows.

7. A temperature responsive flow control valve comprising:
(a) a valve body having a fluid flow passageway extending therewithin; said fluid flow passageway connected proximate a first end to an inlet opening and proximate a second end to an outlet opening;
(b) a valve seat positioned within said fluid flow passageway of said valve body between said inlet opening and said outlet opening and having a valve seat opening extending therethrough;
(c) a valve head biasingly urged into seated engagement with said valve seat from an outlet side of said valve seat;
(d) an abutment member secured to said valve body and extending into said fluid flow passageway at said first end thereof; said abutment member being advanceable relative to said fluid flow passageway such that the distance between said valve head and said abutment member is adjustable;
(e) a thermally responsive actuator having a front end and a rear end and whose length increases as the actuator is heated; said actuator positioned within said fluid flow passageway between said valve head and said abutment member such that said front end of said actuator is positioned proximate said valve head and said rear end is positioned proximate said abutment member; said rear end of said actuator engaging said abutment member and said front end of said actuator engaging said valve head and advancing said valve head away from said valve seat as the temperature of said actuator exceeds the temperature at which the length of the actuator increases to correspond to the distance between the valve head and the abutment member;
(f) said abutment member is threadingly secured within a plug which is secured across said fluid flow passageway at said first end of said valve body;
(g) said abutment member is connected to a knob by a shaft extending through said plug;
(h) temperature indicia is printed on an outer face of said plug radially relative to said knob and indicating the rotational orientation of the actuator at which the distance between the abutment member and the seated valve head approximately corresponds to the length of the actuator when the temperature of the actuator corresponds to the selected temperature indicia; and
(i) said valve head and said valve seat are shaped to form an incomplete seal when said valve head is seated relative to said valve seat such that at least a small amount of fluid is allowed to flow past the valve head at all times.

8. The valve as in claim 7 further comprising:
(a) a thermometer having a temperature sensing probe extending into said fluid flow passageway proximate said valve seat on an inlet side thereof and a temperature gauge extending outside of said valve body.

9. The valve as in claim 7 wherein said actuator comprises:
(a) a canister filled with a heat expansible material;
(b) a plunger slidably secured relative to said canister and extending partially through an opening in said canister;
(c) said plunger is separated from said heat expansible material by a flexible wall.

10. The valve as in claim 7 wherein said wall comprises a bellows.

* * * * *